(12) United States Patent
Garofalo

(10) Patent No.: US 11,123,632 B2
(45) Date of Patent: Sep. 21, 2021

(54) METHOD AND APPARATUS FOR CONTROLLING VIDEOGAMES

(71) Applicant: XPLORED SRL, Genoa (IT)

(72) Inventor: Enrico Garofalo, Genoa (IT)

( * ) Notice: Subject to any disclaimer, the term of this patent is extended or adjusted under 35 U.S.C. 154(b) by 172 days.

(21) Appl. No.: 16/481,469

(22) PCT Filed: Feb. 24, 2018

(86) PCT No.: PCT/IT2018/050027
§ 371 (c)(1),
(2) Date: Jul. 29, 2019

(87) PCT Pub. No.: WO2018/154619
PCT Pub. Date: Aug. 30, 2018

(65) Prior Publication Data
US 2019/0366201 A1   Dec. 5, 2019

(30) Foreign Application Priority Data

Feb. 24, 2017   (IT) .................. 102017000020955

(51) Int. Cl.
*A63F 13/211*   (2014.01)
*A63F 13/213*   (2014.01)
(Continued)

(52) U.S. Cl.
CPC .......... *A63F 13/211* (2014.09); *A63F 13/213* (2014.09); *A63F 13/217* (2014.09);
(Continued)

(58) Field of Classification Search
None
See application file for complete search history.

(56) References Cited

U.S. PATENT DOCUMENTS 6,144,370 A * 11/2000 Eleyan ................ G06F 3/03549
                                                                    273/148 B
8,864,589 B2 * 10/2014 Reiche, III ............. A63F 13/02
                                                                    463/44
(Continued)

FOREIGN PATENT DOCUMENTS

EP   1852163 A2   11/2007
EP   2749328 A1   7/2014

OTHER PUBLICATIONS

ISR; European Patent Office; NL; dated Aug. 15, 2018.

*Primary Examiner* — James S. McClellan
*Assistant Examiner* — Peter J Iannuzzi
(74) *Attorney, Agent, or Firm* — PatShegen IP; Moshe Pinchas

(57) ABSTRACT

A system for driving physical characteristics of a virtual world of a videogame provided with a physics engine module. The system including a gaming apparatus and a standard primary control device and an additional control device including a stationary base and a sphere. The stationary base is adapted to support the sphere and the sphere is detachable from the stationary base and manipulable by a player. The sphere is provided with a unique identifier and a communication system with the base. The sphere and the base include sensors. The system including means for detecting physical parameters within a player environment and using them to drive corresponding physical characteristics of the virtual world of the videogame.

6 Claims, 5 Drawing Sheets

(51) Int. Cl.
*A63F 13/217* (2014.01)
*A63F 13/24* (2014.01)
*A63F 13/42* (2014.01)
*A63F 13/98* (2014.01)

(52) U.S. Cl.
CPC .............. *A63F 13/24* (2014.09); *A63F 13/42* (2014.09); *A63F 13/98* (2014.09)

(56) References Cited

U.S. PATENT DOCUMENTS

| | | | | |
|---|---|---|---|---|
| 2002/0054011 A1* | 5/2002 | Bruneau | ................ | A63F 13/06 345/156 |
| 2008/0309010 A1* | 12/2008 | Bowling | ................... | A63F 9/14 273/243 |
| 2010/0285883 A1 | 11/2010 | Zalewski | | |
| 2016/0325180 A1 | 11/2016 | Nelson | | |
| 2018/0111046 A1* | 4/2018 | Roberts | ................ | A63F 13/245 |

\* cited by examiner

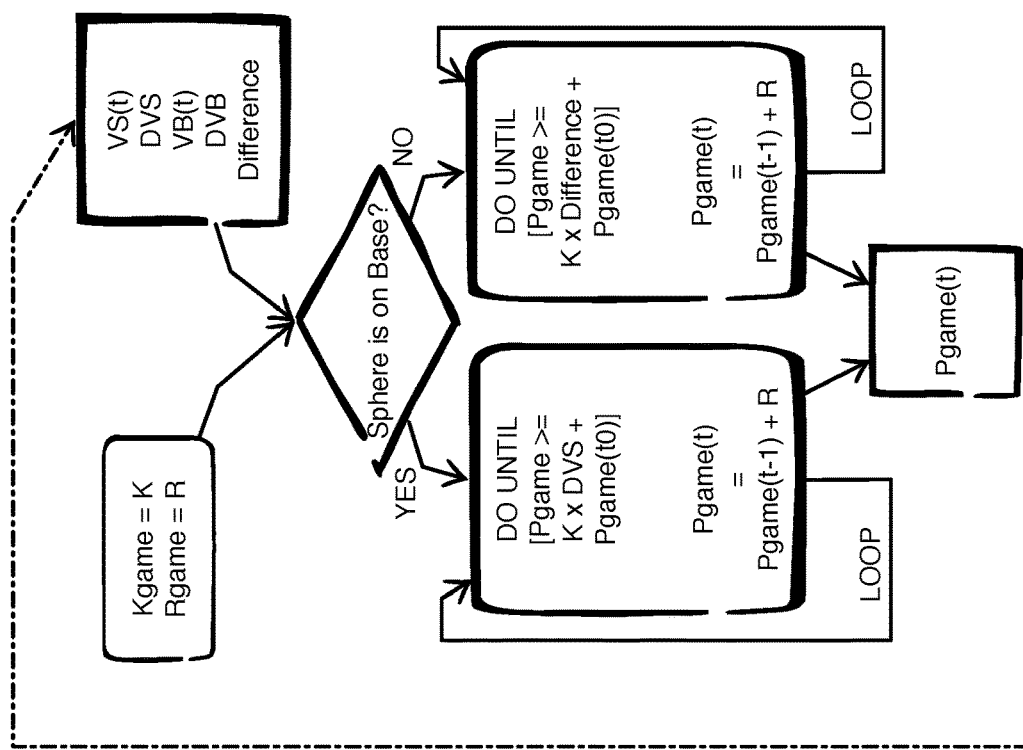
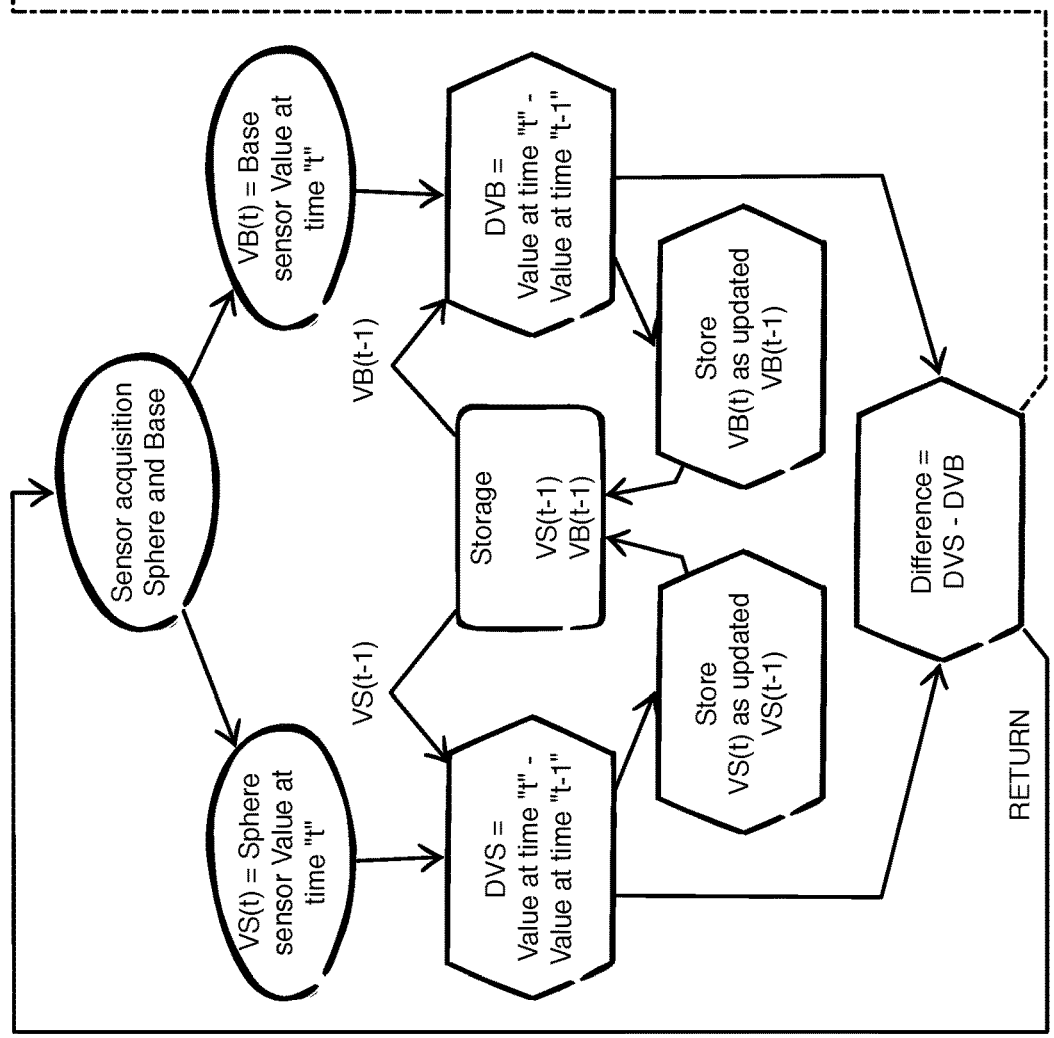
Fig.4 - Algorithm (400)

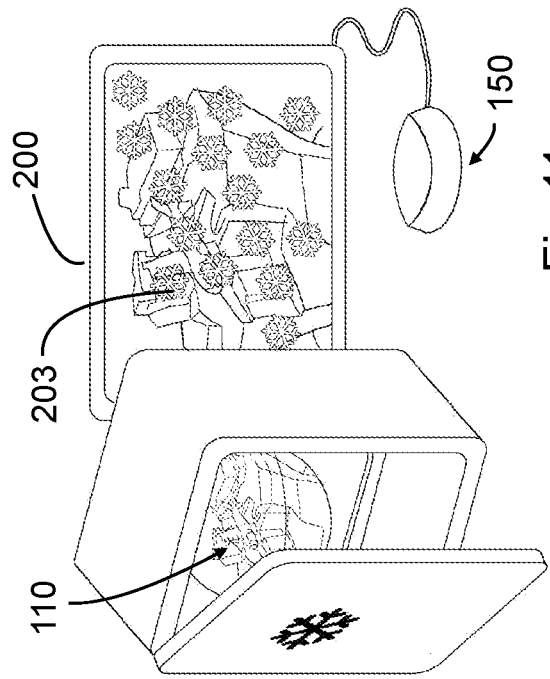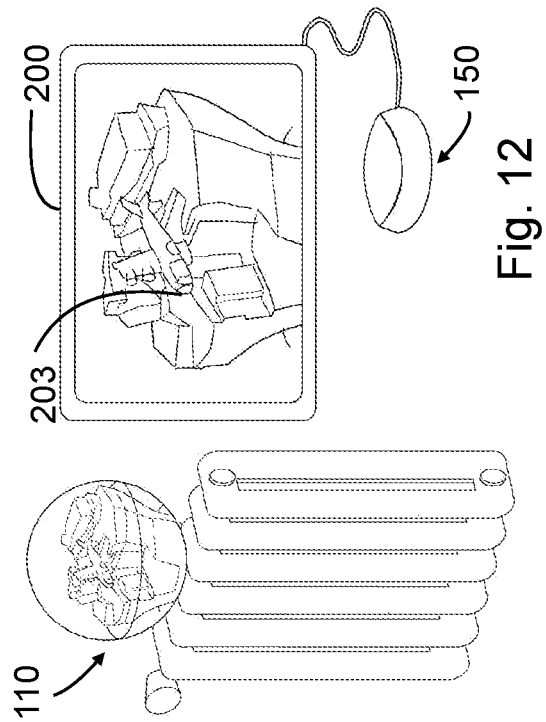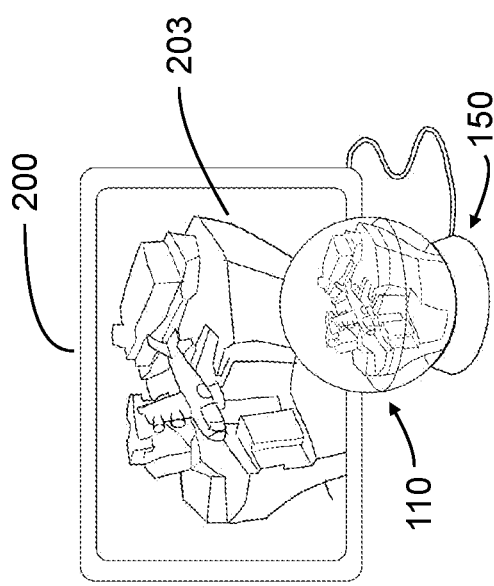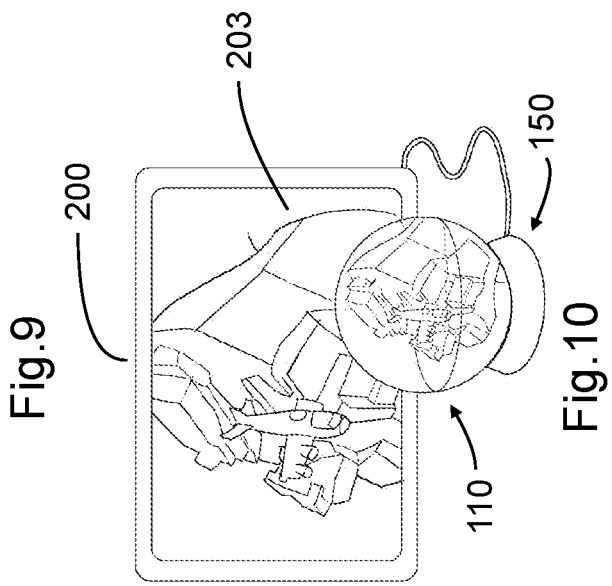

METHOD AND APPARATUS FOR CONTROLLING VIDEOGAMES

STATE OF THE ART

The "game controllers" or gaming controllers are control devices useful to provide input signals to entertainment systems. A controller for videogames is usually connected via a wired or wireless connection to electronic devices such as consoles, personal computers, tablets, smartphones and allows the user to directly govern the game elements and its settings.

Over time, various hardware solutions have been proposed, starting from devices such as joysticks, gamepads, mouse devices, trackballs, push-button panels, pedals, steering wheels, up to decidedly more complex solutions based on touchscreens (e.g. tablets and smartphones or portable consoles such as Nintendo DS) or on motion sensors (e.g. Wii Remote) or even on complex image acquisition and processing systems, able to detect the user's movement (Microsoft Kinect) or to detect complex commands through the combined use of motion sensors on controllers and systems for detecting the user's position through additional bases (as in US 2010/285883 A1). All of these devices, which allow to convert physical actions and/or movements of the player into pre-established gaming commands, have been backed up or integrated in time with solutions that increase the gaming experience and, above all, the player's involvement with respect to the context of the videogame, connecting the physical reality of the player and his environment with the virtual reality of the videogame, which is run on the used gaming apparatus. Therefore, a plurality of controllers has been developed, characterized by the integration of actuators able to return to the player sensations related to the virtual world in which he is playing (with sensory feedback such as temperature variation, vibrations, etc., as for example in US 2009/233710).

Alternatively, and in a specular manner, controllers have been implemented that are capable of detecting physical parameters from the real world and of using such information as input to make predefined changes in the videogame. These solutions provide for the use of appropriate sensors integrated into the gaming controller or console, which can be used to acquire the player's own physical parameters (temperature, heart rate, etc., as in US2008171596), or related to the environment in which the player himself is located (temperature, light, sound, etc., as for example in US2010311501). In these cases, the involvement of the player increases by relating characteristics and parameters of the real world, in which the user finds himself, with characteristics of the virtual environment of the videogame.

Finally, different solutions are known that use, as additional interaction systems, identifying tags (for example RFID) and related reading devices, allowing to interact differently with the videogame, selecting actions or activating content based on the used object (as in EP 2 749 328 A1 or WO2016178256).

TECHNICAL FIELD

The connection between the real world and the virtual world of the videogame, in the aforementioned solutions, occurs by measuring, using sensors, appropriate physical parameters, mostly environmental, such as temperature, noise, etc., and/or personal parameters of the player, such as heart rate, as well as converting this information, in a predetermined manner, into game commands or in corresponding, limited and predefined modifications of the game scenarios.

A typical example is the detection of the noise in the room where the player is located: an increase in the "background" noise is transposed, in the videogame, in the appearance of a crowd of cheering spectators; another example can be the monitoring of the temperature detected by the control device, whose value and variations allow to activate specific functions in the game (for example, to facilitate the hatching of an egg).

In existing systems, therefore, there is always a pre-established and limited connection to a narrow set of options, between the variation of an environmental parameter, detected in the real world, and a corresponding gaming command or procedure, implemented within the virtual gaming world. These correlations are therefore predetermined, since they are defined beforehand by the creator of the videogame at the time of realization, and limited, as they are restricted to a reduced set of possible changes, and there is no direct correspondence between the variations detected in the "real" world and homologous variations reconstructed in the virtual world.

The traditional control system, therefore, continues to be used to give commands to the playable elements and to guarantee a more "free" interaction on the part of the user, while the additional sensors, possibly integrated into the controller or in the same gaming apparatus, have the functionality of detecting environmental variables of the real world and of activating, consequently, changes to the scenarios or specific game events, selecting them from a limited series of predetermined options.

The measured environmental parameter, therefore, possesses, in known solutions, a mere function of recalling scenarios and of unlocking certain predefined game situations; to date, there are no more complex solutions, in which said environmental physical parameters (temperature, sound, etc.) are translated and transferred to the virtual world of gaming, thus allowing a dynamic and not univocally predetermined control of videogame environments. Above all, there are no solutions in which non-predetermined actions (voluntary or otherwise) carried out by the player in the real world, that intervene on physical and environmental parameters (for example, changing temperature or light in the physical world, through a plurality of unpredictable actions beforehand), produce variations, corresponding of the same parameters within the virtual world of the game, thus altering the gaming experience itself, not just by means of a banal recall of limited and predefined procedures.

The object of the present invention is to provide a system for controlling a videogame which allows to improve the gaming experience through a greater interaction between the physical world in which the player is located and the virtual world of a videogame, said system based on an additional controller, functionally connectable to electronic devices such as tablets, smartphones, gaming consoles and PCs.

The solutions proposed today to bring the real world and the virtual world closer together all have all relevant functional limits, related in particular to the fact that the sensors dedicated to acquiring "environmental" information are integrated into the same gaming controllers, used for direct interaction, or within the gaming apparatus itself (console, portable device, etc.); this configuration significantly limits the user's freedom of action and the possibilities for interaction. Furthermore, none of the solutions proposed in the literature makes it possible to identify the voluntary nature of the environmental and/or physical variations detected, since no method is foreseen to discern changes in physical parameters linked to environmental phenomena from changes made by direct and voluntary action of the user.

Finally, the existing solutions provide for the use of variables detected by additional (personal or environmental) sensors for the sole purpose of activating predefined and limited changes (selected within a reduced set of possible options, all predetermined), without creating a direct and univocal match, that is relevant to the same physical parameters, between the interaction in the real world and the changes to the gaming world. The changes made, therefore, are only "aesthetic" changes and do not influence, if not in a limited and marginal way, the rules and methods of execution of the game itself. Therefore, to improve player involvement and increase the level of interaction between the real world and the virtual world, it is necessary to create more adaptable and flexible videogame control systems capable of detecting variations in various physical parameters and determining whether such variations are voluntary or not, and define a method that allows to transpose, in full coherence, the variations occurred in the gaming environment and/or user interactions with the control system, in corresponding variations of the same physical parameters the inside of the gaming world, without limitation, therefore, to the activation of pre-established procedures or events, but leaving full freedom to modify the rules of the videogame.

Compared to the solutions available on the market (which, with various techniques, translate the physical movements performed by the player into commands and/or which detect some physical parameters of the environment for purely evocative purposes, etc.), the present invention is intended to provide player a tool that allows you to interact with the parameters of the virtual world in a free and not predetermined way, allowing to change, directly or indirectly, different physical characteristics (e.g. gravity, temperature, light, etc.) within the videogame, through corresponding actions performed on the device itself.

DISCLOSURE OF THE INVENTION

The proposed solution consists in backing up the control device of the gaming apparatus in which a videogame is being run (for example a traditional gamepad, a touchscreen interface, etc.) with a further device, which can be used with additional controller functions, realized in the form of a physical miniature, representative of the entire virtual gaming world, with which the player can physically interact not only mechanically, but also through interactions involving other "characteristics" and parameters (for example, by way of example and not limitation: temperature, light, orientation in space, etc.), thus determining corresponding variations of the "physics" of the virtual gaming world, in a deterministic way, while leaving the user free to choose the direct or indirect implementation modalities of these variations (for example, the luminous intensity involved could be reduced in a direct way, by covering the control device with a cloth, turning off the light in the room or simply shading the device with hands, etc.).

This miniature is equipped with appropriate sensors, designed to detect and map various physical characteristics (by way of example and not limitation: movement, orientation in space, temperature, light, sound, magnetic fields, etc.) and to transmit any variations over time of said characteristics to a processing unit, able to dynamically convert, through suitable adaptation algorithms, said information into coherent variations of the same physical characteristics, within the virtual world of the game, modifying, in a non-predefined and non-predeterminable way, the gameplay experience itself.

The physical miniature of the world is also equipped with a radiofrequency communication system, adapted to allow its communication with a suitable base, also equipped with appropriate sensors and connected to the gaming apparatus, in such a way as to give the player full freedom of movement and interaction with the miniature itself and to provide the system with further information on the same physical characteristics, useful for identifying the user's voluntary interactions.

The analysis of the data acquired by the corresponding sensors on the miniature and on the base, in fact, allows, through a suitable method, to discern which variations of the different physical parameters are linked to simple environmental factors (for example the lowering of room temperature or the variation of light due to the passage of time) and which are, instead, linked to voluntary actions, expressed by the user through direct interaction with the device.

The idea is therefore to create a miniature/toy that represents the virtual world inside the videogame, with which the player can physically interact, in the real world, through a multitude of freely undertaken actions (for example touching it, shaking it, illuminating it or putting it in a dark place, heating or cooling it, etc.), in such a way as to consequently generate corresponding effects on the virtual gaming world, which can convey the feeling of actually physically interacting with the game environment.

In order to achieve this result, it is necessary to construct a method of information transfer that involves integrating a physics engine module into the videogame, i.e. a functional software module able to parametrically manage all the physical variables of the virtual world (gravity, temperature, position of the sun, etc.). In this way, the actions/interactions of the player with the miniature in the physical world (unpredictable beforehand) can be detected by the different sensors placed on miniature and base (e.g. temperature, light and movement), analysed in such a way as to discern the variations determined by voluntary interaction from variations caused by changes in the environment and, therefore, processed and transmitted to a suitable motor/interpreter (physics engine of the videogame), which deals with converting the variations of said parameters into coherent variations of the corresponding in-game physical parameters, thus conditioning their performance accordingly. The use of this apparatus (additional controller provided with sensors) and of the relevant method of use (made up of the system for the detection of the various physical parameters, of the algorithm of analysis of said parameters and of detection of the voluntary interaction performed by the user and from the physics engine integrated in the videogame), therefore, allows to convert into commands and parameters of the virtual game an unpredictable plurality of direct and indirect actions, freely undertaken by the player in the physical world, creating a different level of physical-virtual interaction and much deeper than today's solutions.

DETAILED DESCRIPTION OF THE DRAWINGS

Further characteristics and advantages of the proposed technical solution will appear more evident in the following description of a preferred but not exclusive embodiment shown by way of example and not limitation in the accompanying 5 drawing tables, wherein:

FIG. 1 indicates the structure of the hypothesized controller, constituted for example by an object of spherical shape, made of transparent material and containing a miniature of the virtual world, and a base, connected wirelessly to the gaming apparatus; this controller can be used alongside a traditional control system, specific for the gaming apparatus (for example a gamepad) in which the videogame with which interaction is desired is running.

FIG. 2 indicates an embodiment of the controller and its base and highlights its electronic and functional components, including the installed sensors, the implemented communications systems and the integrated controls.

FIG. 4 represents the algorithm for managing the data acquired by the sensors installed on the controller, which allows to detect the variations of the different physical parameters, to discern whether the variations detected are voluntary or not, and to transform these variations into modifications of the parameters of the internal physics engine of the videogame.

FIGS. 9, 10 represent, for purely exemplifying and non-limiting purposes, some possible actions with which the player can interact with the controller, determining variations on the motion sensor, suitable to determine corresponding physical variations in the virtual gaming world.

FIGS. 11, 12 represent, for purely exemplifying and not limitative purposes, some possible actions through which the player can interact with the additional gaming controller, determining variations on the installed temperature sensor and causing corresponding temperature variations in the virtual gaming world.

BEST MODE FOR CARRYING OUT THE INVENTION

Figure 1:
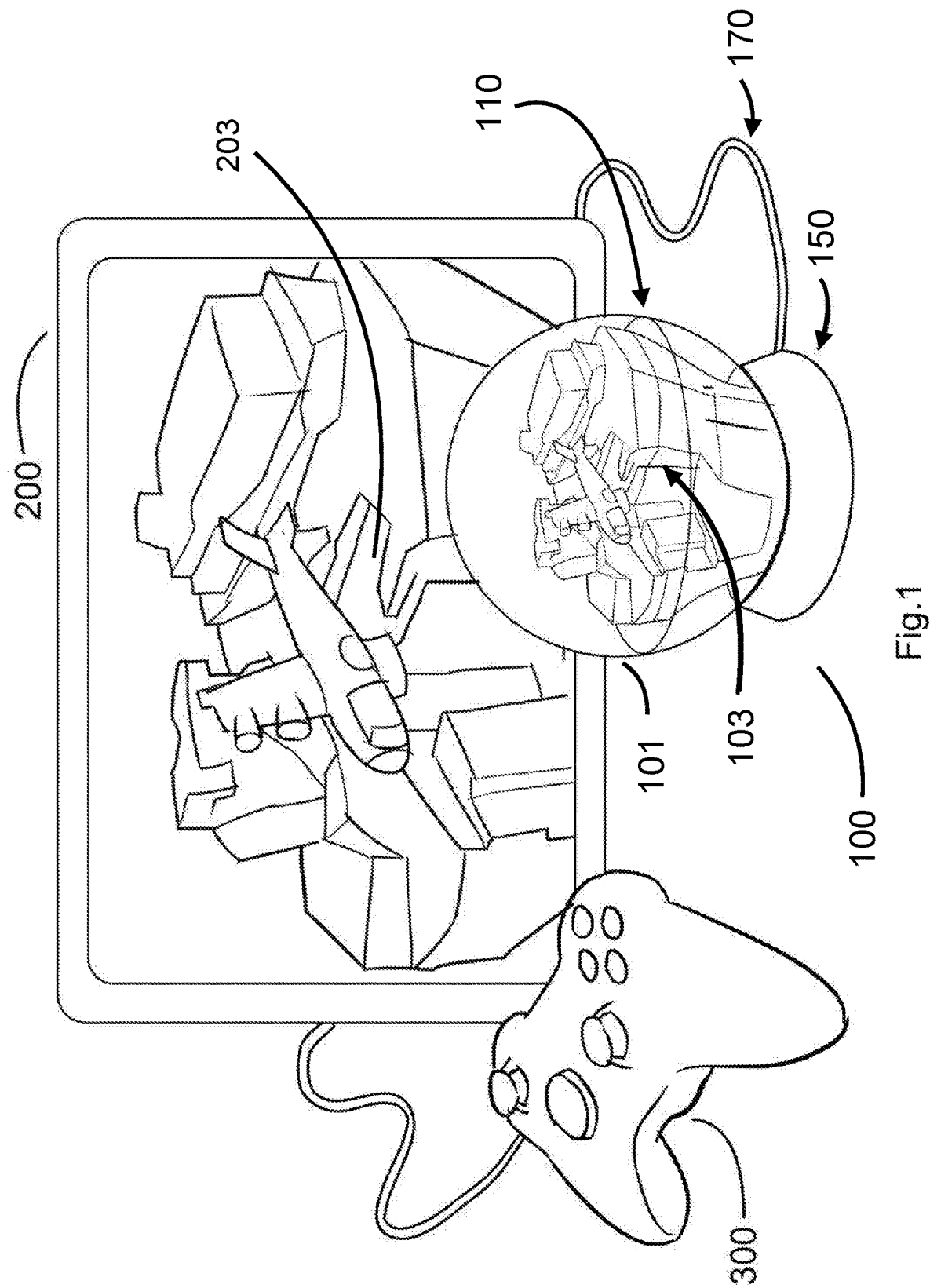

With reference to the attached drawings, and in particular to FIG. 1 of the same, an embodiment example of a gaming system consisting of a gaming controller object of the invention (100) is shown. Said controller can possibly be used together with a standard controller (300) to control a videogame running on a gaming apparatus (200), such as a console, a personal computer, a smartphone, or equivalent videogame devices. The controller (100) can be connected to the gaming apparatus (200) via a wired or wireless interface connection (170).

The controller (100) object of the invention consists of an element, for example in the form of a sphere (110), made preferably but not necessarily of transparent material (101) inside which a physical miniature (103) representing the same virtual world object of the videogame being run (203).

The sphere (110) can be freely manipulated by the player or supported on a suitable base (150) and is provided with a wireless communication system with said base (150) which is, in turn, connected to the wired or wireless gaming apparatus (200), through an appropriate interface (170).

Figure 2:
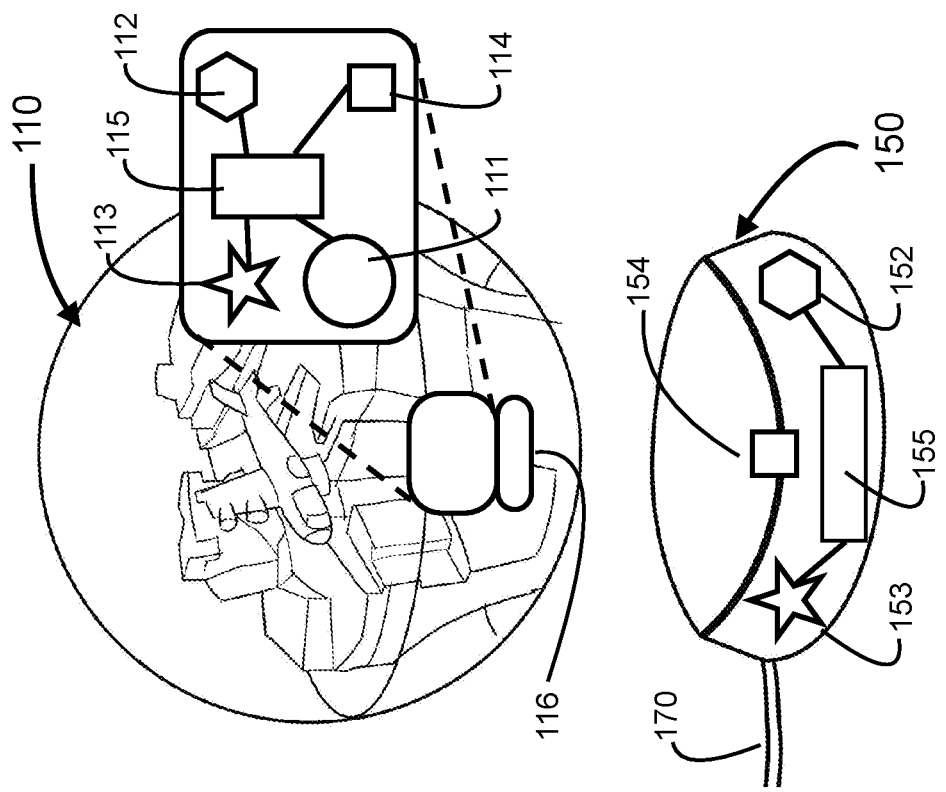

With reference to the attached drawings and in particular to FIG. 2 thereof, a form of the controller is represented with the electronic components installed on the device. Inside the sphere (110), a movement sensor (111), a temperature sensor (112), and a light sensor (113) are installed, useful for transducing and mapping in terms of said variables the actions performed physically by the player on the sphere itself. Always inside the sphere (110) there are also a magnetic switch (114), to allow the activation of the sphere itself, and a wireless acquisition and communication device (115), adapted to transfer the sensor data to the base (150). Said communication device (115) is also provided with a unique identification code, which also allows recognition of the sphere in use, and is powered by an appropriate battery power supply system (116). The base (150) is, in turn, equipped with a temperature sensor (152) to detect the ambient temperature and possibly compare it with the one detected by the corresponding sensor (112) of the sphere (110), on which the player can freely intervene. In a similar manner, the base (150) is provided with a light sensor (153) to measure the light of the physical environment in which the player operates and possibly compare it with the one detected by the corresponding light sensor (113) of the sphere (110). The parameters detected by the sensors positioned on the base (150) are collected by an acquisition and communication unit (155) which, by wireless connection with the corresponding unit (115) placed on the sphere (110), also centralizes all the information related to the different sensors and transmits them via an appropriate interface (170) to the gaming apparatus. On the base (150) there is also a magnet (154), able to activate the magnetic switch on the sphere (114) when it is placed on the base, in order to start the communication between the two units placed on the sphere (115) and on the base (155), as well as allowing the system to detect when the user is freely interacting with the controller and when, instead, he is holding it on the base.

Figure 3:
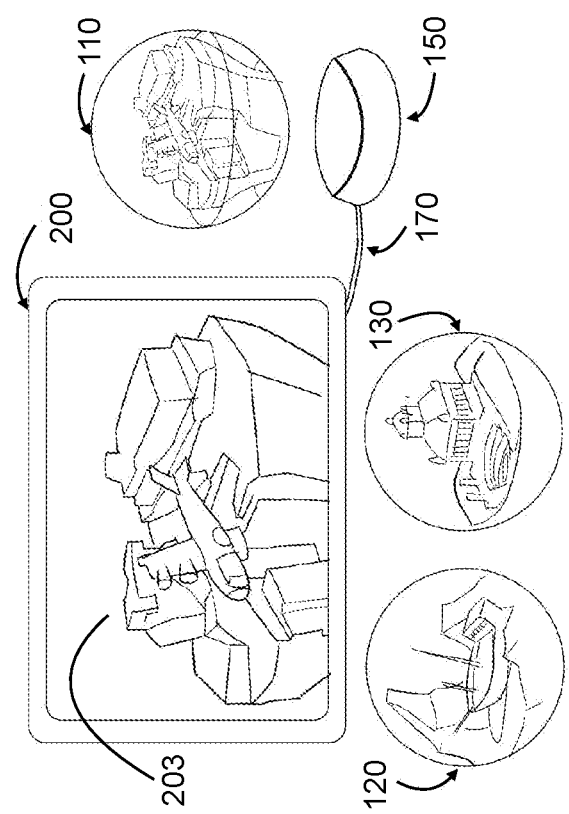
FIG. 3 represents the modularity of the system and the possibility of using different miniatures, corresponding to different games or different areas/environments of a same game.

With reference to the attached drawings and in particular to FIG. 3 of the same, a plurality of spheres (110, 120, 130) can be used, alternatively used in combination with the base (150), to recall and univocally control specific environments or virtual worlds, within the videogame (203) running in the gaming apparatus (200); said plurality of spheres is representative of the possibility of using different miniatures in correspondence with different games or different scenarios of a same game.

The attached drawings and in particular FIG. 4 represent the algorithm through which the possible direct and indirect actions that the player makes with the sphere in the physical world (unpredictable beforehand) are mapped through the physics parameters detected by the sensors installed on the sphere (110) itself and on the base (150) and subsequently interpreted and processed by the algorithm and transferred to the game in the form of parameters, useful to modify, in coherence with the actions undertaken, the virtual gaming environment, modifying the relative virtual physical parameters (gravity, ambient light, temperature, etc.).

In particular, to discern between the variations of the various parameters voluntarily implemented by the user and involuntary variations, linked to changes in environmental conditions, the system compares the corresponding values (where present) detected by the sensors on the base and on the sphere; if the sphere is on the base, the system will be considered as a whole, averaging the values measured by the corresponding sensors and interpreting the commands as "environmental" changes, which will be assigned a certain "weight" limited to the transposition of the variations within the virtual world; if, instead, the sphere is moved directly by the player and used separately from the base, the variation of the different parameters will be detected according to the difference between the "direct" measurement (detected by the sphere) and the "indirect" measurement (detected by the base) of the same parameter, in order to identify more precisely the user's will; the system will assign a much higher "weight" to these variations in transposing information from the physical to the virtual world.

Said algorithm also defines the modalities with which the variations detected by the various sensors are transferred to the physics engine integrated in the videogame, modifying the parameters of the corresponding physical characteristics of the virtual world; in particular, to improve the level of interaction, each variable will be assigned predetermined variables, depending on the videogame and/or the scenario, useful to define the proportion with which, for each characteristic, the variations detected in the physical world will have to be transposed in the gaming world (for example, a variation of a few degrees of the temperature of the physical world could be transposed into a variation of many degrees of temperature in the virtual world), as well as the speed with which such changes will occur (for example, a rapid change of the light intensity detected by the sensors could be transposed into a corresponding variation in terms of intensity, but more gradual, of the in-game light).

Figure 5:
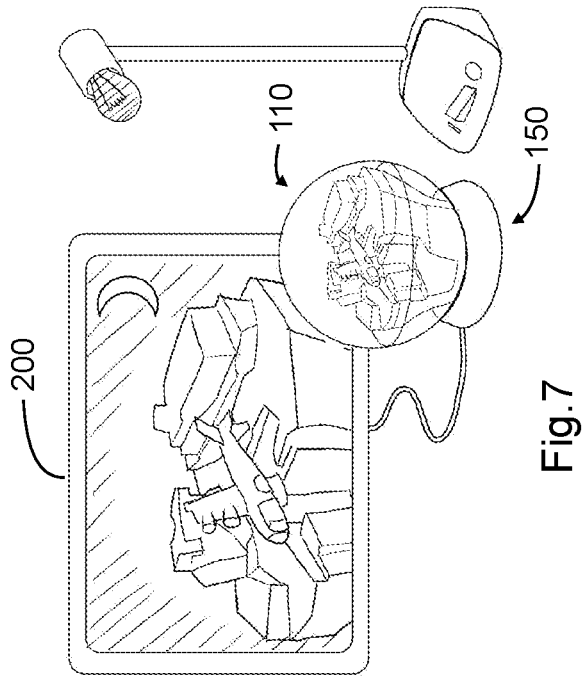
FIGS. 5, 6, 7, 8 represent, for purely exemplifying and non-limiting purposes, different actions with which the player can interact with the gaming controller, directly or indirectly, causing variations on the installed light sensor, suitable to determine corresponding variations of the light, within the virtual gaming world.
Figure 6:
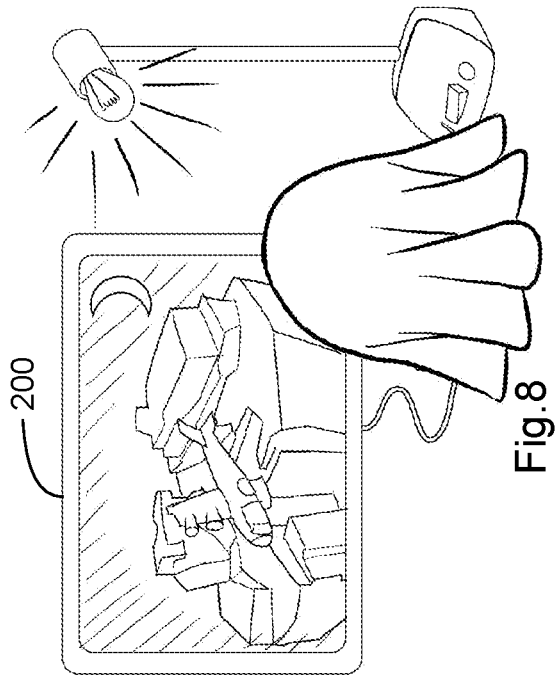
Figure 7:
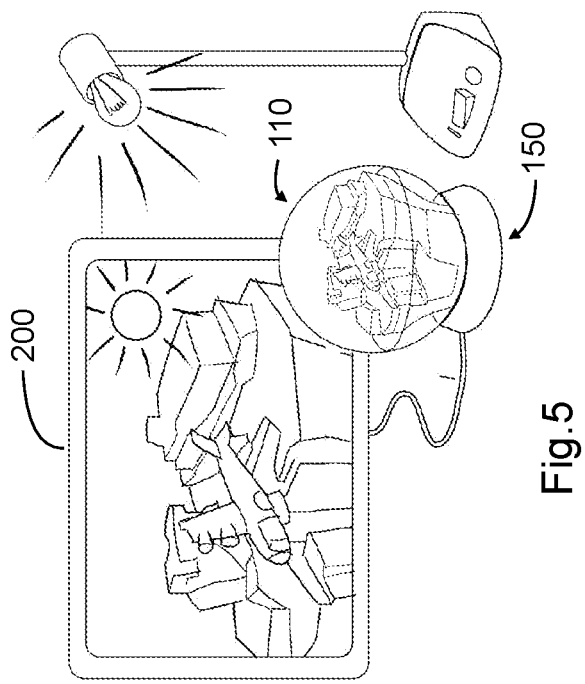
Figure 8:
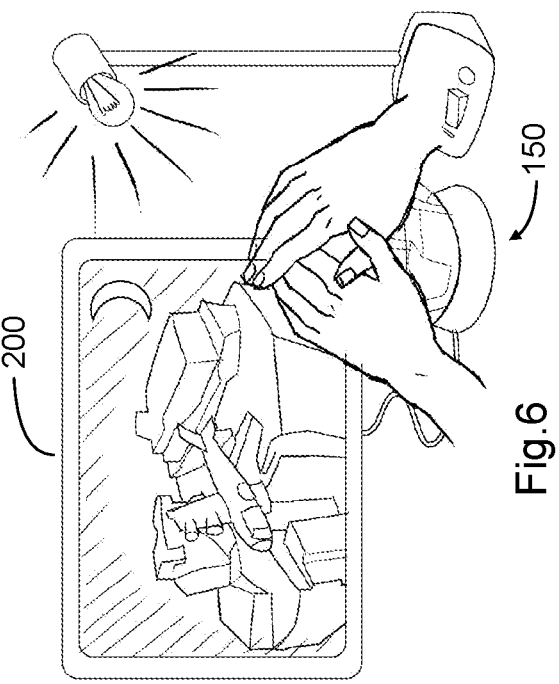

The attached drawings and, in particular, FIGS. 5, 6, 7 and 8, represent various direct and indirect methods, with which the user can obtain the same variation of the gaming parameters consistent with the changes made to the control device, in the physical world; in the specific case, in the representation of FIG. 5, the controller is illuminated and the sun shines in the virtual gaming world; in FIG. 6 the user shades the device with his hands and night falls in the game; in FIG. 7 the light of the room is turned off, and night falls in the game; in FIG. 8 the device is put in the dark by covering it with a cloth and night falls in the game.

The attached drawings and, in particular, FIGS. 9 and 10, represent the reflection in the videogame of the user's "mechanical" interactions with the world's miniature is represented; in particular, by modifying the orientation of the additional controller, a consistent variation of gravity in the virtual world is determined.

The attached drawings and, in particular, FIGS. 11 and 12, represent the reflection in the videogame of the physical interactions performed by the user on the control device, and in particular, in FIG. 11, the sphere is placed in a cold place and in the virtual world the temperature decreases coherently and snow starts falling; in FIG. 12, the sphere is placed in a warm place and in the virtual world the temperature rises in a coherent way.

INDUSTRIAL APPLICABILITY

The invention can be realized with technical equivalents, with supplementary materials or solutions suitable for the purpose and the application scope. Conformation and dimensions of the constituent parts may vary in a suitable, but consistent way with the proposed solution.

By way of example and not of limitation, it is noted that the geometric shapes of the involved parts may be varied while maintaining the above-mentioned functionalities. In particular, the shapes of the element hypothesized for a representative but non-limiting purpose as sphere (110), of the base (150) and, of course, of the miniatures (113) may change according to the different games or the different purposes. At the hardware level, it will be possible to change the number and type of sensors installed on the sphere (110) and on the base (150), including any types of additional sensors with respect to those presented in the exemplary embodiment; as an example, additional magnetic field sensors, microphones, etc. can be integrated into the base or sphere.

By varying these implementations, it will be necessary to change the conditioning, acquisition and communication circuits between elements, without, however, departing from the purpose and scope of application of the proposed solution.

ADVANTAGES OF THE INVENTION AND SCOPE OF THE CLAIMED PROTECTION

The proposed solution is effective, easy to implement and use and allows to greatly increase the integration and interaction between the physical world and the virtual world of a videogame. In particular, it greatly increases the spectrum of actions coming from the physical world that can be translated in a non-univocal, predetermined or predictable manner into variations of the virtual gaming world and used to modify its development in a non-deterministic manner.

The proposed solution is applied to videogame control systems (game controllers) to be used on gaming devices such as PCs, consoles, tablets, smartphones or equivalent electronic devices to run software for ludic and recreational activities.

The invention claimed is:

1. System for driving physical characteristics of a virtual world of a videogame (203) provided with a physics engine module, said system including a gaming apparatus (200) and a standard primary control device (300), said system further comprising:
   a) an additional control device (100) comprising a stationary base (150) and a sphere (110), said stationary base (150) being adapted to support said sphere (110), said sphere (110) being detachable from said stationary base (150) and manipulable by a player, said sphere (110) being provided with a unique identifier and a communication system with said base (150), both said sphere (110) and said base (150) comprising sensors;
   b) means for detecting physical parameters within a player environment and using the detected physical parameters to drive corresponding physical characteristics of the virtual world of the videogame (203); wherein said means detect players voluntary interactions by collecting and comparing data from said sensors of the stationary base (150) with data from said sensors of the sphere (110) and by processing such data depending on whether the sphere (110) is placed on the stationary base (150) or not.

2. The system according to claim 1 wherein said sphere (110) is made of transparent material (111) and contains a physical miniature (113), representing a virtual scenario of the videogame (203) and said sphere (110) includes a motion sensor (111), a temperature sensor (112), a light sensor (113), a wireless communication system (115), a battery (116) and a magnetic switch (114).

3. The system according to claim 1, wherein said stationary base (150) includes a temperature sensor (152), a light sensor (153), a wireless acquisition and communication system (155) and a magnet (154) capable of exciting the magnetic switch (114) of the sphere (110), when said sphere (110) is positioned on said stationary base (150).

4. The system according to claim 1 wherein said sphere (110) can be replaced by another sphere chosen from a plurality of additional spheres (120, 130), wherein said additional spheres (120, 130) are provided with a unique identifier and a miniature representing a different scenario of the virtual world of a videogame (203).

5. The system according to claim 1, wherein the data relating to the sensors positioned on both the base (150) and the sphere (110) are collected by the acquisition and communication unit (155) and transmitted to the gaming device through an interface (170).

6. A method (400) for detecting the players voluntary interactions by collecting, comparing and processing data gathered from sensors of the sphere (110) and the stationary base (150) defined in claim 1, and for driving the corresponding physical parameters of a videogame virtual world through a physics engine module (203); the method comprising:

a) acquiring the physical parameters detected by the sensors placed on the stationary base (150) and on the sphere (110) and detecting the variations over time of such physical parameters;

b) checking for the presence of the sphere (110) on the stationary base (150);

c) computing the players voluntary interactions values by comparing the variations detected by the corresponding sensors of the sphere (110) and the stationary base (150), as follows:

if the sphere (110) is placed on the stationary base (150) the values acquired from the sensors are averaged;

if the sphere (110) is not placed on the stationary base (150) the values acquired from the sensors are subtracted;

d) transmitting said players voluntary interactions values to the physics engine module of the videogame (203) and converting said values into corresponding physical characteristics of the virtual world of the videogame (203).

* * * * *